United States Patent
Rosario

(10) Patent No.: US 7,416,215 B1
(45) Date of Patent: Aug. 26, 2008

(54) VEHICLE ANTI-THEFT AND UTILITY STEP SYSTEM

(76) Inventor: Israel Rosario, P.O. Box 834088, West Hollywood, FL (US) 33083

(*) Notice: Subject to any disclaimer, the term of this patent is extended or adjusted under 35 U.S.C. 154(b) by 279 days.

(21) Appl. No.: 11/229,360

(22) Filed: Sep. 16, 2005

(51) Int. Cl.
*B60R 3/00* (2006.01)
*B60S 9/06* (2006.01)

(52) U.S. Cl. .................. 280/763.1; 280/166; 254/424

(58) Field of Classification Search ........... 280/763.1, 280/764.1, 765.1, 766.1, 164.1, 166; 212/302, 212/202; 254/418, 419, 420, 424; 188/32; 70/182, 183, 184, 187, 211, 216
See application file for complete search history.

(56) References Cited

U.S. PATENT DOCUMENTS

| | | | | |
|---|---|---|---|---|
| 3,863,894 A | * | 2/1975 | Mansi et al. ............... 254/420 |
| 4,070,041 A | * | 1/1978 | Brammer ................ 280/763.1 |
| 4,073,259 A | * | 2/1978 | McCoy ..................... 116/33 |
| 4,144,956 A | * | 3/1979 | Baba ......................... 477/113 |
| 4,354,580 A | * | 10/1982 | Delasantos et al. ......... 188/4 R |
| 4,796,864 A | * | 1/1989 | Wilson ...................... 254/425 |
| 5,749,697 A | * | 5/1998 | Davis ........................ 414/680 |
| 5,803,475 A | * | 9/1998 | Dick .......................... 280/163 |
| 6,607,183 B1 | * | 8/2003 | White et al. ................ 254/420 |
| 6,685,211 B2 | * | 2/2004 | Iles ........................... 280/476.1 |
| 6,705,137 B2 | * | 3/2004 | Saladin et al. ............... 70/212 |
| 7,192,007 B2 | * | 3/2007 | Thomas .................... 254/133 R |

* cited by examiner

*Primary Examiner*—Frank B Vanaman
(74) *Attorney, Agent, or Firm*—Edward Dutkiewicz

(57) ABSTRACT

A housing has open and closed ends, an interior and exterior surface between the ends, the exterior surface having front and rear faces with upper and lower faces. A drive screw within the housing has distal and proximal ends with a threaded surface. A drop leg has an exterior surface in sliding contact with the interior surface of the housing and an interior surface with threads operatively coupled with the threads of the drive screw.

1 Claim, 6 Drawing Sheets

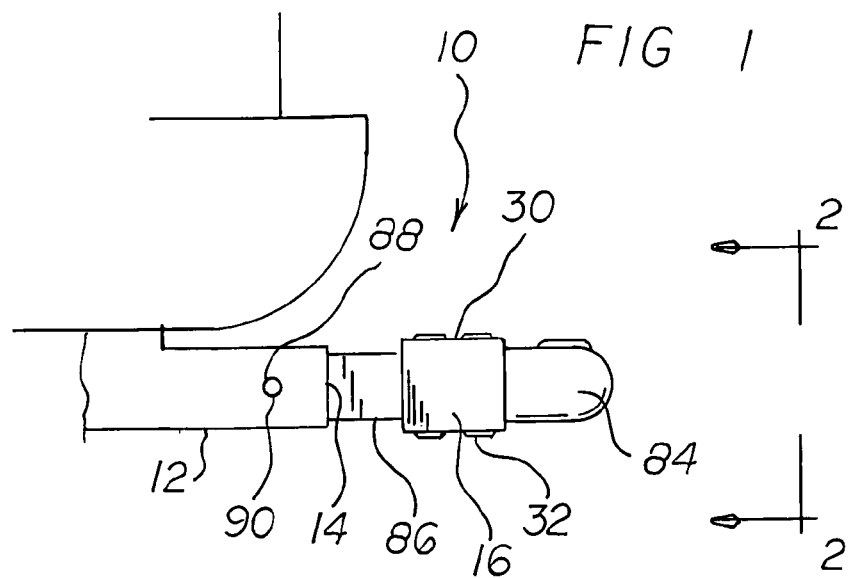
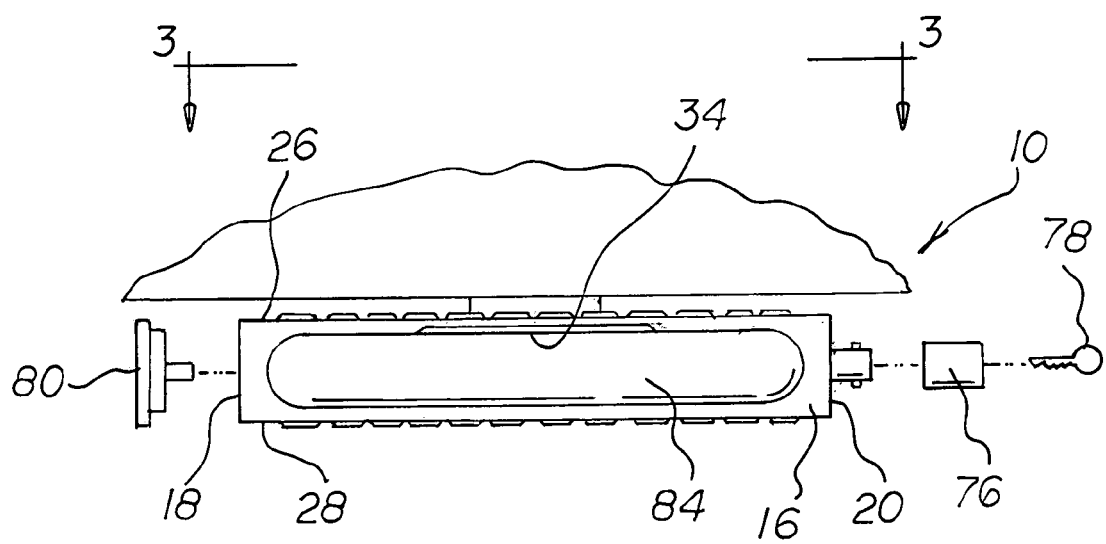

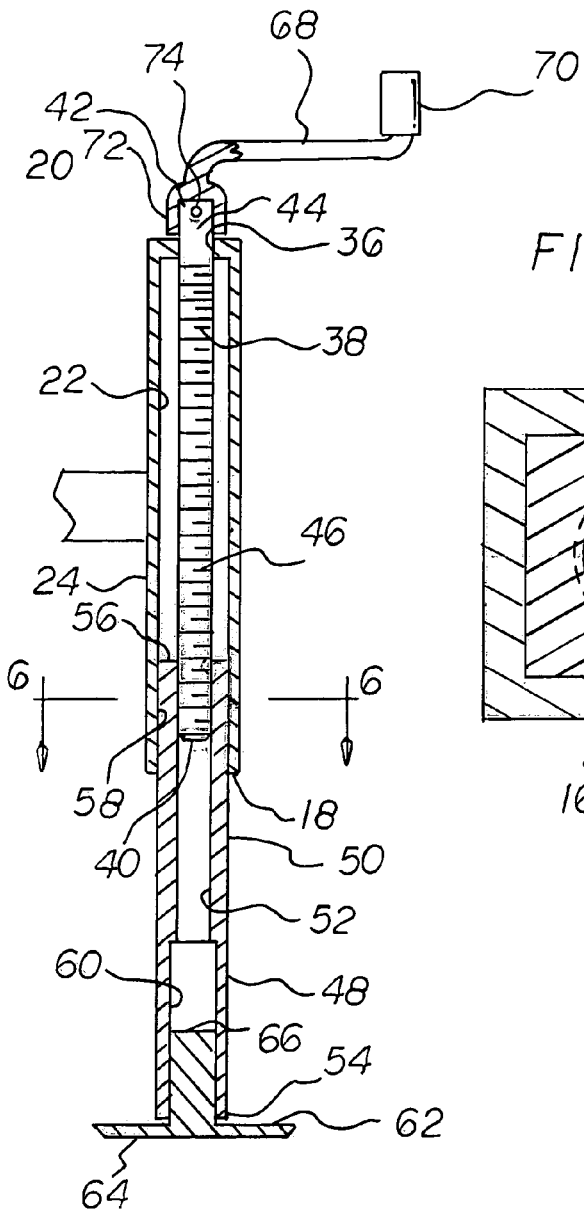
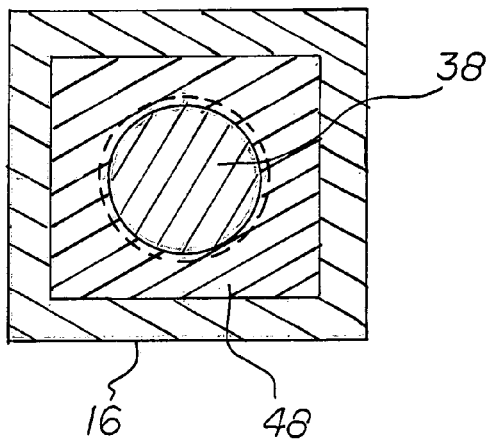

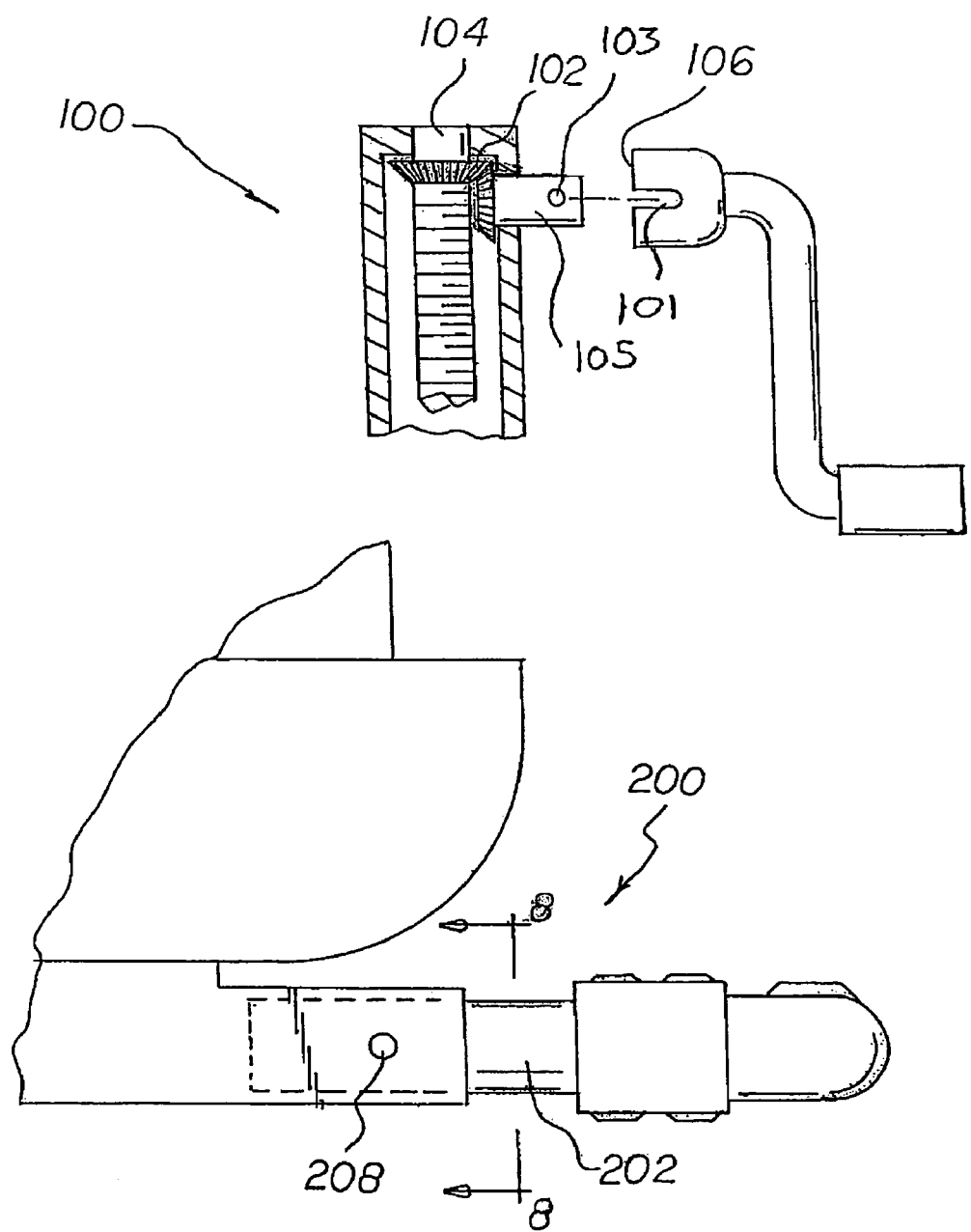

VEHICLE ANTI-THEFT AND UTILITY STEP SYSTEM

BACKGROUND OF THE INVENTION

1. Field of the Invention

The present invention relates to a vehicle anti-theft and utility step system and more particularly pertains to abating theft of a vehicle when in a first orientation and functioning as a utility step when in a second orientation.

2. Description of the Prior Art

The use of vehicle anti-theft systems and utility steps is known in the prior art. More specifically, vehicle anti-theft systems and utility steps previously devised and utilized for the purposes of abating theft of a vehicle or functioning as a utility step are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,836,432 issued May 27, 1958 to Delp relates to a Support Jack for Forward End of Semi-Trailer. U.S. Pat. No. 4,050,403 issued Sep. 27, 1977 to Miller relates to an Auto Repair Ramp with Signal. U.S. Pat. No. 5,067,746 issued Nov. 26, 1991 to Baker relates to an Anti-Theft Jack and Method for Using Same. Finally, U.S. Pat. No. 5,143,386 issued Sep. 1, 1992 to Uriarte relates to an Automatic Leveling System. While these devices fulfill their respective, particular objectives and requirements, the aforementioned patents do not describe a vehicle anti-theft and utility step system that abates theft of a vehicle when in a first orientation and functions as a utility step when in a second orientation.

In this respect, the vehicle anti-theft and utility step system according to the present invention substantially departs from the conventional concepts and designs of the prior art, and in doing so provides an apparatus primarily developed for the purpose of abating theft of a vehicle when in a first orientation and functioning as a utility step when in a second orientation.

Therefore, it can be appreciated that there exists a continuing need for a new and improved vehicle anti-theft and utility step system which can be used for abating theft of a vehicle when in a first orientation and functioning as a utility step when in a second orientation. In this regard, the present invention substantially fulfills this need.

SUMMARY OF THE INVENTION

In view of the foregoing disadvantages inherent in the known types of vehicle anti-theft systems and utility steps now present in the prior art, the present invention provides an improved vehicle anti-theft and utility step system. As such, the general purpose of the present invention, which will be described subsequently in greater detail, is to provide a new and improved vehicle anti-theft and utility step system and method which has all the advantages of the prior art and none of the disadvantages.

To attain this, the present invention essentially comprises a hitch component. The hitch component is adapted to extend rearwardly from the rear of a vehicle. The hitch component has a recess with a square cross sectional configuration.

Next provided is a housing. The housing has a generally rectilinear configuration with a square cross sectional configuration. The housing has an open end and a closed end. The housing also has an interior surface and an exterior surface between the ends. The exterior surface forms a front face and a parallel rear face with a parallel upper face and a parallel lower face between the front and rear faces. The ends are spaced a first distance with an intermediate extent 34 midway between the ends. The closed end is formed with a circular bearing surface.

A drive screw is next provided. The drive screw has a distal end interior of the housing adjacent to the open end and a proximal end exterior of the housing adjacent to the closed end. The drive screw also has a short cylindrical bearing surface in rotational contact with the bearing surface of the closed end of the housing. The drive screw also has a long threaded surface with male threads extending from the distal end to the cylindrical bearing surface.

Next provided is a drop leg. The drop leg has an exterior surface in a generally rectilinear configuration in sliding contact with the interior surface of the housing and an interior surface in a generally cylindrical configuration. The drop leg has a distal end and a spaced proximal end at a second distance slightly shorter than the first distance. The interior surface has female threads operatively coupled with the male threads of the drive screw extending from the proximal end for a majority of the extent of the drive screw. The interior surface has a smooth cylindrical extent extending from the distal end for a minority of the extent of the drive screw. A foot with a planar support surface and a cylindrical projection is removably received in the distal end of the drop leg for support purposes when in a deployed orientation.

A crank is next provided. The crank has an exterior end forming a handle and an interior end removably coupled to the proximal end of the drive screw. The crank is adapted to be rotated by a user in a first direction to withdraw the drop leg into the housing when not in a deployed orientation as for storage and transportation. The crank is adapted to be rotated by a user in a second direction to extend the drop leg from the housing with the foot in contact with ground when in a deployed orientation to abate movement of a vehicle with which the system is utilized. The crank has an associated pin. Associated recesses in the proximal end of the drive screw and interior end of the crank receive the pin during rotation of the crank.

Next provided is a locking cylinder. The locking cylinder is removably positionable over the proximal end of the drive screw with an associated key. In this manner a user with the key prohibits and allows coupling of the crank to the drive screw for thereby permitting only authorized usage of the system.

Next, a cover is provided. The cover is removably positionable over the distal end of the housing when the system is not deployed. An associated opening in the drop leg removably receives the cover during deployment of the system.

An extension is next provided. The extension extends rearwardly from the rear face of the housing and is adapted to function as a step and constitute a support surface for a user to stand upon during operation and use.

Next provided is a coupling projection. The coupling projection has a rectilinear configuration extending forwardly from the forward face of the housing and removably received in the recess of the hitch component with aligned apertures adapted to removably receive a pin for coupling purposes. The projection is adapted to be positioned in the recess of the hitch in a first orientation with the proximal ends above the distal ends and the drop leg extended for abating the theft of a vehicle with which it is utilized. The projection is adapted to be positioned in the recess of the hitch in a second orientation perpendicular to the first orientation with the upper face above the lower face and the drop leg withdrawn for constituting a step for a user.

Lastly, wheel chocks are provided. The wheel chocks are positionable in contact with wheels of a vehicle equipped with the housing, drive screw and drop leg.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle anti-theft and utility step system which has all of the advantages of the prior art vehicle anti-theft systems and utility steps and none of the disadvantages.

It is another object of the present invention to provide a new and improved vehicle anti-theft and utility step system which may be easily and efficiently manufactured and marketed.

It is further object of the present invention to provide a new and improved vehicle anti-theft and utility step system which is of durable and reliable constructions.

An even further object of the present invention is to provide a new and improved vehicle anti-theft and utility step system which is susceptible of a low cost of manufacture with regard to both materials and labor, and which accordingly is then susceptible of low prices of sale to the consuming public, thereby making such vehicle anti-theft and utility step system economically available to the buying public.

Even still another object of the present invention is to provide a vehicle anti-theft and utility step system for abating theft of a vehicle when in a first orientation and functioning as a utility step when in a second orientation.

Lastly, it is an object of the present invention to provide a new and improved vehicle anti-theft system with a housing having open and closed ends, an interior and exterior surface between the ends, the exterior surface having front and rear faces with upper and lower faces. A drive screw within the housing has distal and proximal ends with a threaded surface. A drop leg has an exterior surface in sliding contact with the interior surface of the housing and an interior surface with threads operatively coupled with the threads of the drive screw.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred primary and alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a vehicle anti-theft system for abating the theft of a vehicle when in a first orientation and for functioning as a utility step when in a second orientation constructed in accordance with the principles of the present invention.

FIG. 2 is a rear elevational view of the system taken along line 2-2 of FIG. 1.

FIG. 5 is a cross sectional view of the system taken along line 5-5 of FIG. 4.

FIG. 6 is a cross sectional view of the system taken along line 6-6 of FIG. 5.

FIG. 5A is an enlarged front elevational view similar to FIG. 5 but illustrating an alternate embodiment of the invention.

FIG. 7 is a side elevational view similar to FIG. 1 but illustrating another alternate embodiment of the invention.

The same reference numerals refer to the same parts throughout the various Figures.

DESCRIPTION OF THE PREFERRED EMBODIMENT

Figure 3:
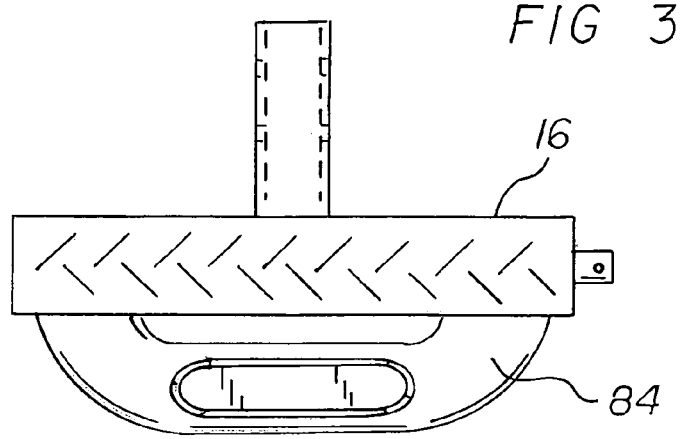
FIG. 3 is a plan view of the system taken along line 3-3 of FIG. 2.

With reference now to the drawings, and in particular to FIG. 1 thereof, the preferred embodiment of the new and improved vehicle anti-theft and utility step system embodying the principles and concepts of the present invention and generally designated by the reference numeral 10 will be described.

The present invention, the vehicle anti-theft and utility step system 10 is comprised of a plurality of components. Such components in their broadest context include a housing, a drive screw, a drop leg and a crank. Such components are individually configured and correlated with respect to each other so as to attain the desired objective.

The vehicle anti-theft system 10 is for abating the theft of a vehicle when in a first orientation and for functioning as a utility step when in a second orientation. First provided is a hitch component 12. The hitch component is adapted to extend rearwardly from the rear of a vehicle. The hitch component has a recess 14 with a square cross sectional configuration.

Next provided is a housing 16. The housing has a generally rectilinear configuration with a square cross sectional configuration. The housing has an open end 18 and a closed end 20. The housing also has an interior surface 22 and an exterior surface 24 between the ends. The exterior surface forms a front face 26 and a parallel rear face 28 with a parallel upper face 30 and a parallel lower face 32 between the front and rear faces. The ends are spaced a first distance with an intermediate extent 34 midway between the ends. The closed end is formed with a circular bearing surface 36.

A drive screw 38 is next provided. The drive screw has a distal end 40 interior of the housing adjacent to the open end and a proximal end 42 exterior of the housing adjacent to the closed end. The drive screw also has a short cylindrical bearing surface 44 in rotational contact with the bearing surface of the closed end of the housing. The drive screw also has a long threaded surface 46 with male threads extending from the distal end to the cylindrical bearing surface.

Next provided is a drop leg 48. The drop leg has an exterior surface 50 in a generally rectilinear configuration in sliding contact with the interior surface of the housing and an interior surface 52 in a generally cylindrical configuration. The drop leg has a distal end 54 and a spaced proximal end 56 at a second distance slightly shorter than the first distance. The interior surface has female threads 58 operatively coupled with the male threads of the drive screw extending from the proximal end for a majority of the extent of the drive screw. The interior surface has a smooth cylindrical extent 60 extending from the distal end for a minority of the extent of the drive screw. A foot 62 with a planar support surface 64 and a cylindrical projection 66 is removably received in the distal end of the drop leg for support purposes when in a deployed orientation.

A crank 68 is next provided. The crank has an exterior end 70 forming a handle and an interior end 72 removably coupled to the proximal end of the drive screw. The crank is adapted to be rotated by a user in a first direction to withdraw the drop leg into the housing when not in a deployed orientation as for storage and transportation. The crank is adapted to be rotated by a user in a second direction to extend the drop leg from the housing with the foot in contact with ground when in a deployed orientation to abate movement of a vehicle with which the system is utilized. The crank has an associated pin 74. Associated recesses in the proximal end of the drive screw and interior end of the crank receive the pin during rotation of the crank.

Next provided is a locking cylinder 76. The locking cylinder is removably positionable over the proximal end of the drive screw with an associated key 78. In this manner a user with the key prohibits and allows coupling of the crank to the drive screw for thereby permitting only authorized usage of the system.

Next, a cover 80 is provided. The cover is removably positionable over the distal end of the housing when the system is not deployed. An associated opening 82 in the drop leg removably receives the cover during deployment of the system.

An extension 84 is next provided. The extension extends rearwardly from the rear face of the housing and is adapted to function as a step and constitute a support surface for a user to stand upon during operation and use.

Next provided is a coupling projection 86. The coupling projection has a rectilinear configuration extending forwardly from the forward face of the housing and removably received in the recess of the hitch component with aligned apertures 88 adapted to removably receive a pin 90 for coupling purposes. The projection is adapted to be positioned in the recess of the hitch in a first orientation with the proximal ends above the distal ends and the drop leg extended for abating the theft of a vehicle with which it is utilized. The projection is adapted to be positioned in the recess of the hitch in a second orientation perpendicular to the first orientation with the upper face above the lower face and the drop leg withdrawn for constituting a step for a user.

Lastly, wheel chocks 92 are provided. The wheel chocks are positionable in contact with wheels of a vehicle equipped with the housing, drive screw and drop leg.

In an alternate embodiment illustrated in FIG. 5A, the system 100 further includes a bevel gear 102 coupling the proximal end 104 of the drive screw and the interior end 106 of the crank. In this embodiment, the interior end of the crank is rotatable about an axis perpendicular to the axis of rotation of the drive screw. The crank is removable as shown in FIGS. 2, 5 and 5A. The crank has a pair of recesses 101 for engaging the cross pin 103 of the drive screw 105. The ability to remove the crank allows the user to lock the position of the screw with the locking cylinder 76, in any orientation. The locking cylinder is removably attached to the proximal end of the drive screw when the drive screw is either in the deployed or stored orientations, as shown in FIGS. 2, 5, and 5A.

Figure 8:
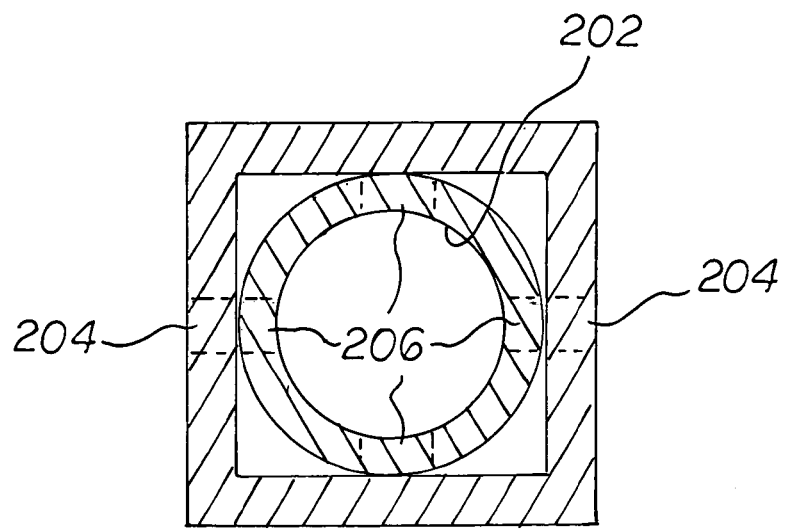
FIG. 8 is a cross sectional view of the system taken along line 8-8 of FIG. 7.

In another alternate embodiment of the invention illustrated in FIGS. 7 and 8, system 200 further includes a coupling projection 202 with a cylindrical configuration extending forwardly from the front face of the housing adapted to be removably received in a recess of a component of a trailer hitch. In this embodiment, the cylindrical projection has aligned primary apertures 204 extending through the coupling projection and secondary apertures 206 extending through the coupling projection at right angles to the primary apertures. A locking pin 208 secures the coupling projection and housing in either of two orientations.

Figure 9:
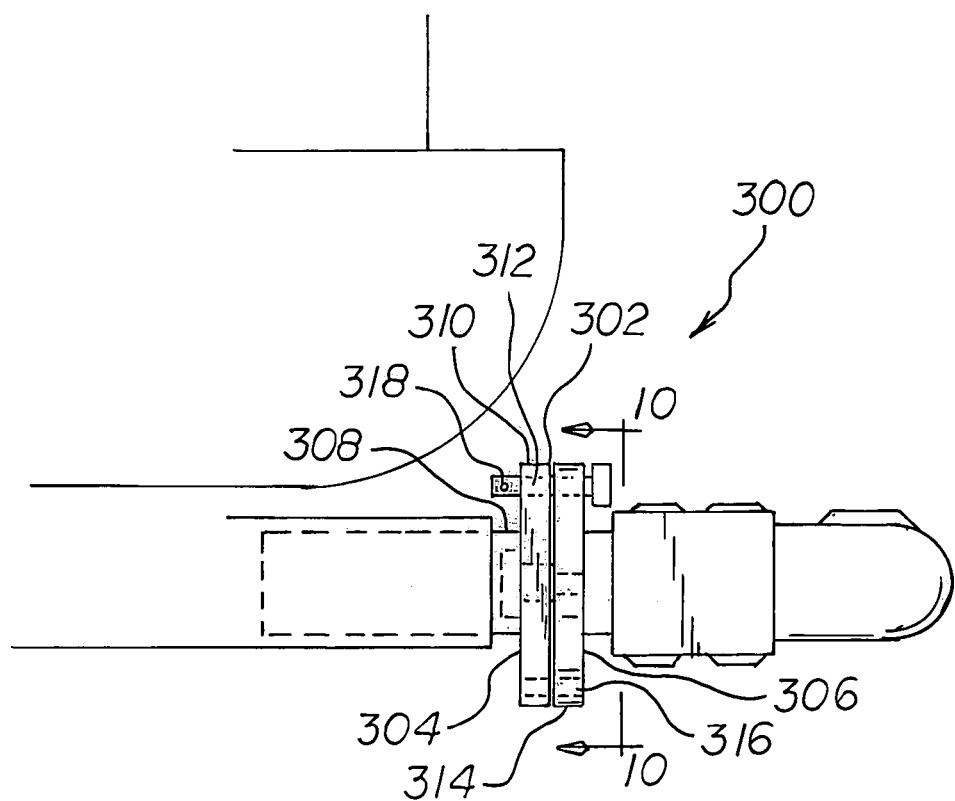
FIG. 9 is a side elevational view similar to FIGS. 1 and 7 but illustrating a final alternate embodiment of the invention.
Figure 10:
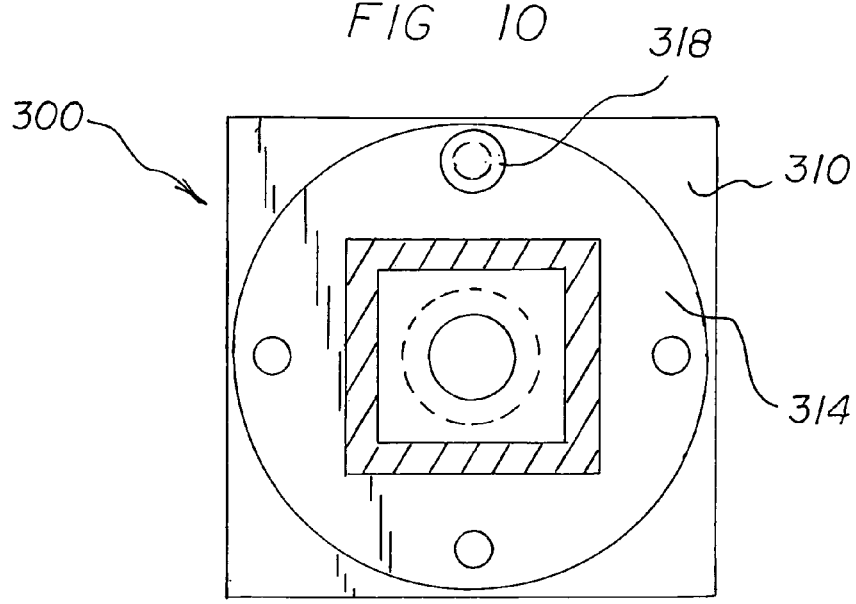
FIG. 10 is a cross sectional view of the system taken along line 10-10 of FIG. 9.
Figure 11:
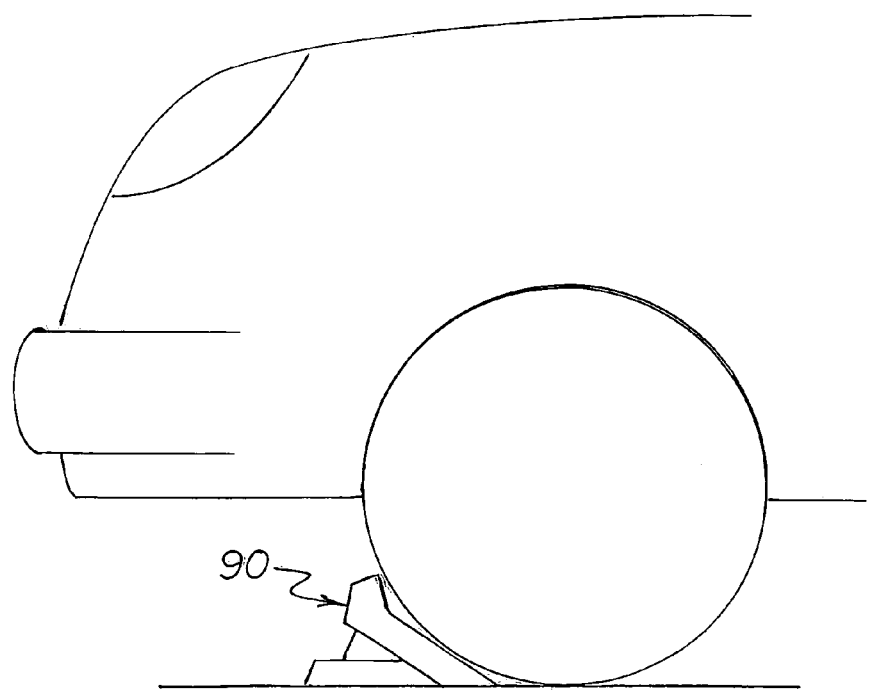
FIG. 11 is a side elevational view of a vehicle utilizing the system of the present invention and also utilizing wheel chocks as an optional feature of the invention.

In a final alternate embodiment, illustrated in FIGS. 9 and 10, the system 300 further includes a coupling projection 302 with an interior section 304 and an exterior section 306. The interior section has a projection 308 with a rectilinear configuration extending forwardly adapted to be removably received in a recess of a component of a trailer hitch. A fixed flange 310 has a pair of apertures 312 rearwardly. The exterior section is coupled to the front face of the housing rearwardly. A rotatable flange 314 has two pairs of apertures 316 forwardly. A pin 318 couples the apertures of the flanges in either of two rotational orientations.

In the primary and alternate embodiments of the invention, there is illustrated a single hitch receiver component 12. The hitch receiver component extends rearwardly from the rear of a vehicle and is formed with a single recess 14. It should be understood, however, that the present invention may be configured to include a supplemental hitch receiver component, similar in construction to the illustrated hitch receiver component, but extending rearwardly from the system as described.

Figure 4:
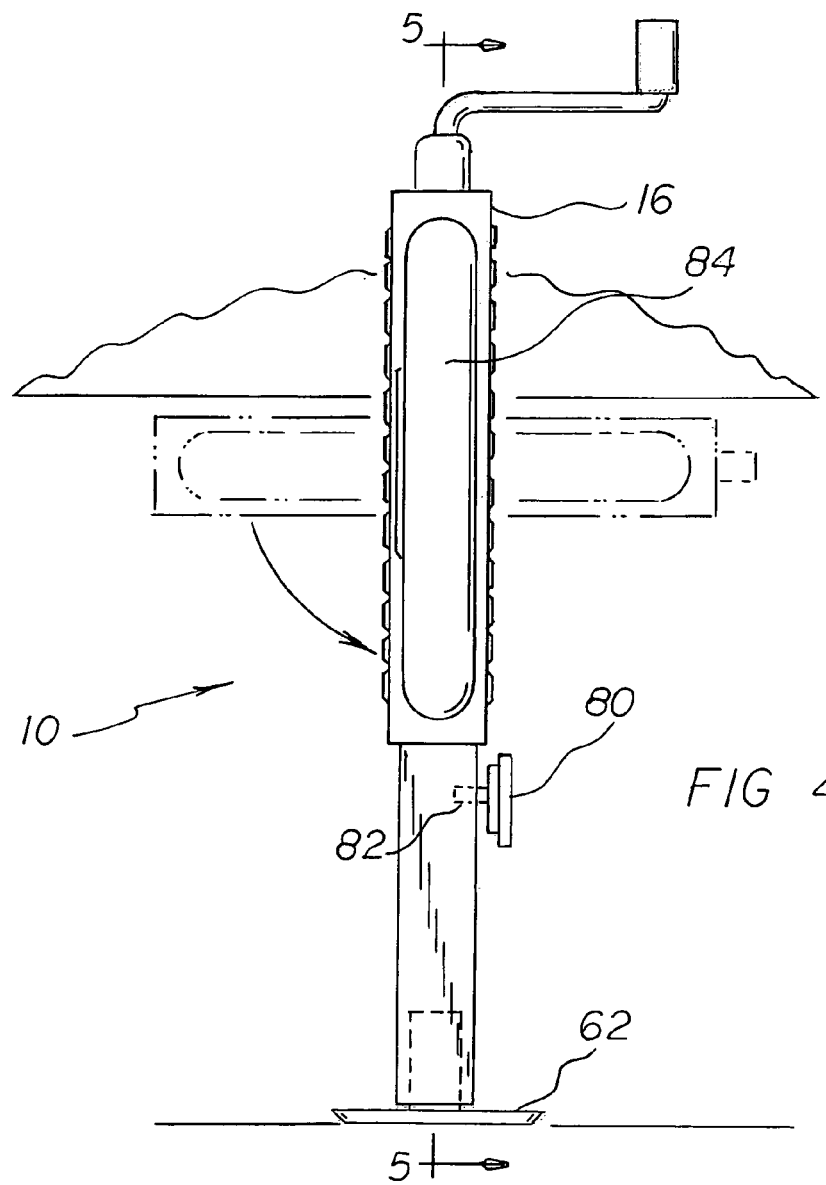
FIG. 4 is a front elevational view of the system shown in the prior Figures but with the drop leg in an extended or deployed orientation in solid lines and with the drop leg retracted in broken lines.

In addition, in the primary and alternate embodiments of the invention, there is illustrated a crank 68 which may be rotatable about the axis of the screw 38, FIGS. 4 and 5, or about an axis perpendicular thereto, FIG. 5A. It should be understood, however, that the present invention may be alternately configured to include a drive for the screw other than a manual crank as illustrated. Such alternate configuration may include a hydraulic drive or other powered drive.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle jack and anti-theft system for jacking and abating the theft of a vehicle when in a first orientation and for functioning as a utility step when in a second orientation comprising, in combination:

a hitch component adapted to extend rearwardly from the rear of a vehicle, the hitch component having a recess with a square cross sectional configuration;

a housing having a generally rectilinear configuration with a square cross sectional configuration and with an open end and a closed end and with an interior surface and an exterior surface between the ends, the exterior surface forming a front face and a parallel rear face with a parallel upper face and a parallel lower face between the front and rear faces, the ends being spaced a first distance with an intermediate extent midway between the ends, the closed end being formed with a circular bearing surface;

a drive screw having a distal end interior of the housing adjacent to the open end and a proximal end exterior of the housing adjacent to the closed end, the drive screw having a short cylindrical bearing surface in rotational contact with the bearing surface of the closed end of the housing, the drive screw having a long threaded surface with male threads extending from the distal end to the cylindrical bearing surface;

a drop leg having an exterior surface in a generally rectilinear configuration in sliding contact with the interior surface of the housing and an interior surface in a generally cylindrical configuration, the drop leg having a distal end and a spaced proximal end at a second distance slightly shorter than the first distance, the interior surface having female threads operatively coupled with the male threads of the drive screw extending from the proximal end for a majority of the extent of the drive screw, the interior surface having a smooth cylindrical extent extending from the distal end for a minority of the extent of the drive screw, a foot with a planar support surface and a cylindrical projection removably received in the distal end of the drop leg for support purpose when in a deployed orientation;

a crank with an exterior end forming a handle and an interior end removably coupled to the proximal end of the drive screw, the crank adapted to be rotated by a user in a first direction to withdraw the drop leg into the housing when not in a deployed orientation as for storage and transportation, the crank adapted to be rotated by a user in a second direction to extend the drop leg from the housing with the foot in contact with ground when in a deployed orientation to jack and abate movement of a vehicle with which the system is utilized, the foot adapted to be extended a first shorter distance to contact ground and function for anti-theft purposes, the foot adapted to be extended a second greater distance to contact ground and raise a portion of a vehicle to function for jacking purposes, the crank having an associated pin with associated recesses in the proximal end of the drive screw and interior end of the crank receiving the pin during rotation of the crank;

a removably positionable over the proximal end of the drive screw with an associated key for allowing a user with the key to prohibit and allow coupling of the crank to the drive screw for thereby permitting only authorized usage of the system;

a cover removably positionable over the distal end of the housing when the system is not deployed with an associated opening in the drop leg for removably receiving the cover during deployment of the system;

an extension extending rearwardly from the rear face of the housing adapted to function as a step and constitute a support surface for a user to stand upon during operation and use;

a coupling projection with a rectilinear configuration extending forwardly from the forward face of the housing and removably received in the recess of the hitch component with aligned apertures adapted to removably receive a pin for coupling purposes, the projection adapted to be positioned in the recess of the hitch in a first orientation with the proximal ends above the distal ends and the drop leg extended for jacking and abating the theft of a vehicle with which it is utilized, the projection adapted to be positioned in the recess of the hitch in a second orientation perpendicular to the first orientation with the upper face above the lower face and the drop leg withdrawn for constituting a step for a user; and wheel chocks positionable in contact with wheels of a vehicle equipped with the housing, drive screw and drop leg.

* * * * *